INVENTORS
CHANH-TRUNG HUYNH
LUCIEN ESPAGNO
BY
Bacon & Thomas
ATTORNEYS

United States Patent Office
3,512,152
Patented May 12, 1970

3,512,152
ANALOGUE DIGITAL DEVICE

Chanh-Trung Huynh and Lucien Espagno, Pau, France, assignors to Societe Nationale des Petroles d'Aquitaine, Paris, France, organized under the laws of France
Filed Feb. 11, 1966, Ser. No. 526,778
Claims priority, application France, Feb. 16, 1965, 5,771
Int. Cl. H03k *13/20*
U.S. Cl. 340—347 4 Claims

ABSTRACT OF THE DISCLOSURE

An analogue to digital converter apparatus for converting the maximum amplitude of successive continuing signals represented by voltage peaks which are delivered onto a single input of the apparatus by a sampling multichannel apparatus which cyclically samples various continuing magnitudes which vary simultaneously.

The present invention relates to a device of the analogue digital type for converting the amplitude of signals which appear periodically.

Analogue digital devices for converting the amplitude of periodic signals are already conventional in the art. Some of these devices operate on the following principle:

As soon as a signal appears and it is desired to measure its amplitude, a pulse counter is actuated to count the pulses which cease when the signal reaches its maximum value; after which the decrease in the signal, which causes the number of pulses counted during the period in which the signal is increasing to be conveyed to a processing unit, is detected.

Devices of this type generally comprise a comparator-amplifier circuit which receives the signal to be measured through an attenuating arrangement, and also a reference signal. The output of the comparator is connected to a trigger with a threshold value which controls the closing or opening of a gate, depending upon whether the signal to be measured is of a greater or lower amplitude than the reference signal. The gate enables pulses produced by a fixed frequency pulse generator to pass along to a counter unit. An analogue digital converter, the input of which is connected to the counter unit and the output of which is connected to the comparator, supplies the reference signal, the value of which is always proportional to the number of pulses contained in the counter unit.

Finally a circuit is provided to control the transfer of the contents of the counter unit to a processing unit (printer, store, adder, etc.). A device of this type may, of course, be provided with as many processing units, particularly stores and adders, as there are signals to be coded in the measuring cycle, particularly when the device is being used periodically to determine, by a sampling process, the concentration of a number of constituents in a mixture.

The invention consists in an analogue-digital device for converting the amplitude of signals which appear periodically, of the type above described, and which comprises means for detecting the point at which the signal to be measured begins to decrease and for controlling the transfer of data contained in the counter unit to the processing unit appropriate to the coded signal, means further being provided for detecting any overflow in the counter and for readjusting the device for a new measuring cycle.

When the signals to be measured are conveyed periodically from a mass spectrometer, the device may include means for blocking the signal-coding operation and the conveying of the data from the counter unit during the return of the mass spectrometer scanning cycle.

Figure 1:
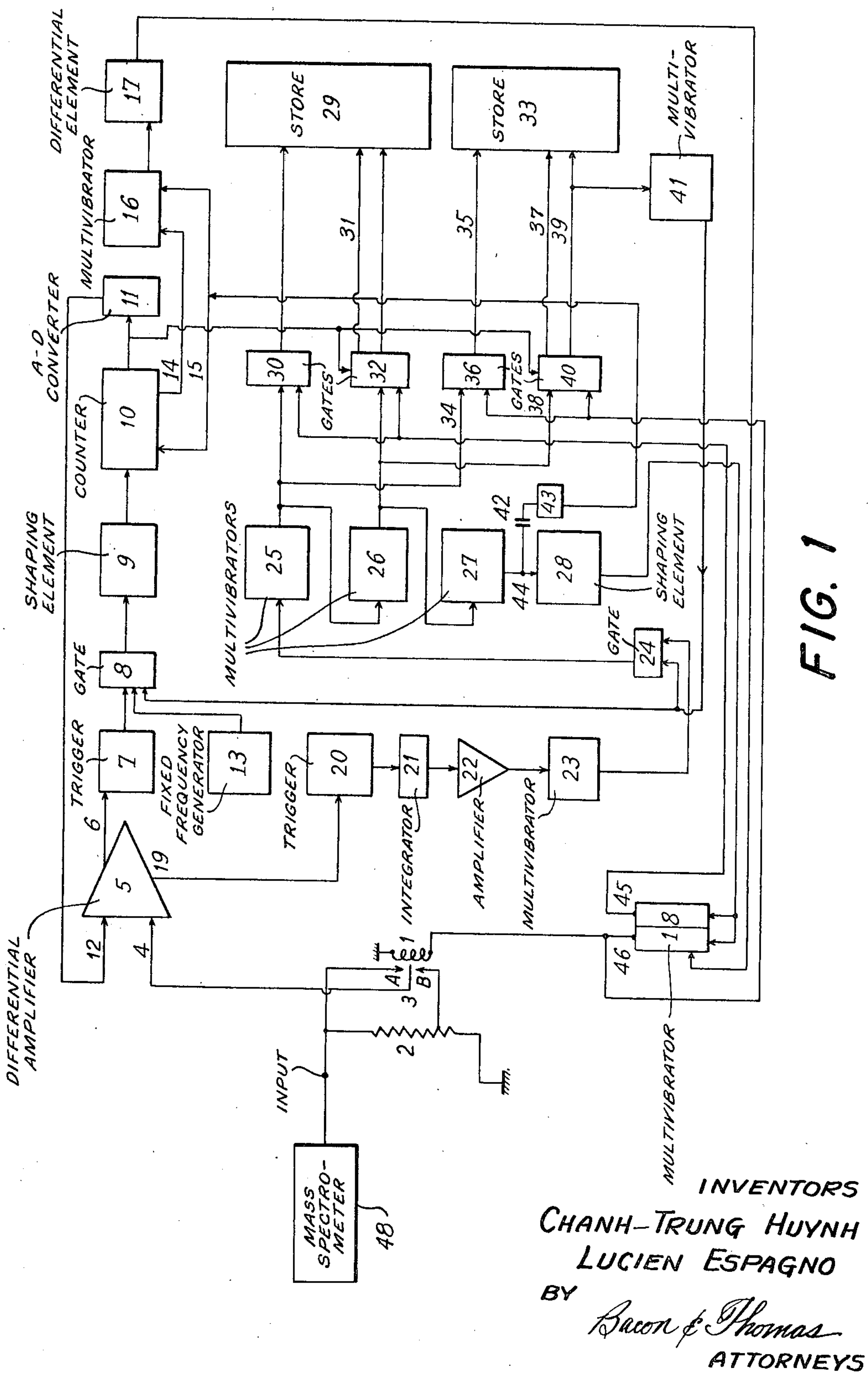
Figure 2:
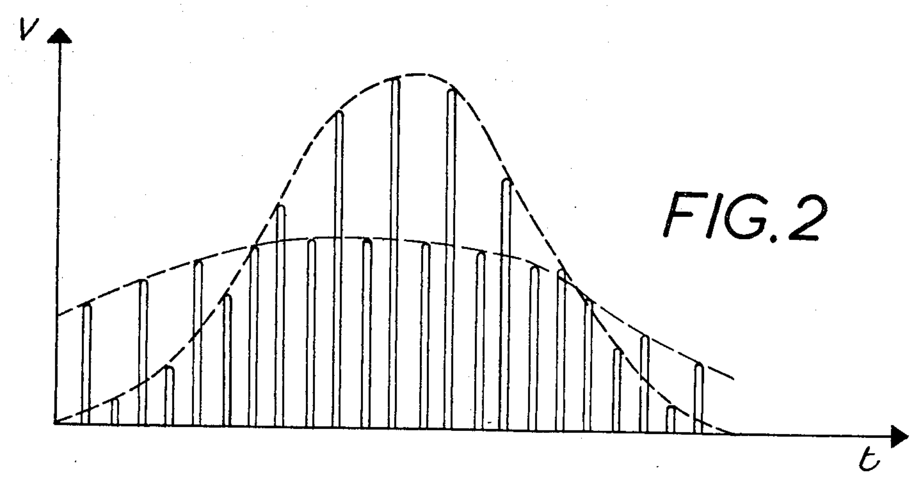
Figure 3:
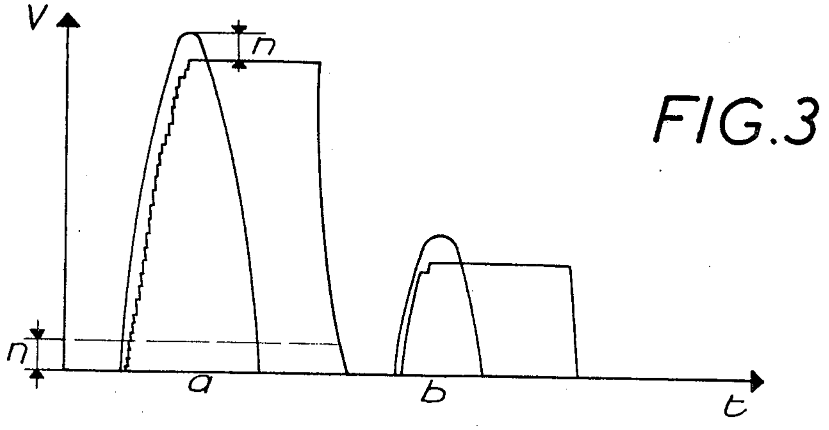
Figure 4:
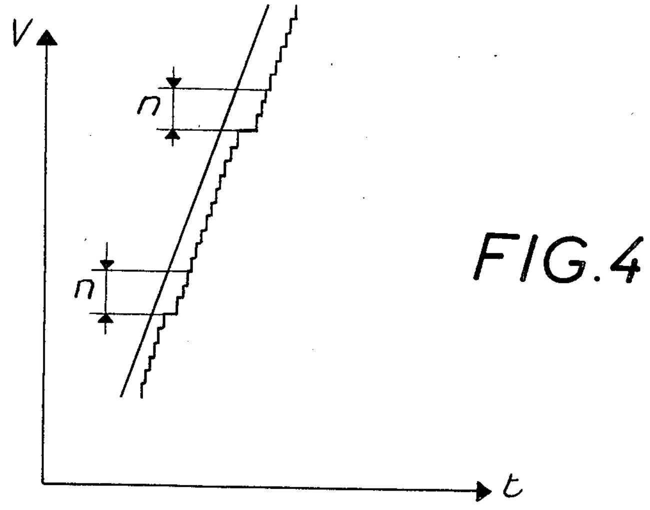

Other advantages and characteristics will become clear from the following description of an embodiment of the device of the invention, the description being given purely by way of example and referring to the accompanying drawings in which:

FIG. 1 shows a device according to the invention for following the variations in time in the composition of a mixture of two constituents, FIG. 2 represents the peaks of intensity at the output of a mass spectrometer which is analyzing a mixture of two constituents of which the concentration varies in time according to the curves of points which are around the peaks of intensity, FIG. 3 represents two successive peaks of intensity *a* and *b* during the course of one cycle, and FIG. 4 represents, on an expanded time scale, the curve of increase of a peak and the curve of increase in rise in intensity of input signal.

Referring now to FIG. 1, this diagrammatically illustrates a sensitive switching relay connected to a dividing bridge, an analogue digital converter with a binary counter to which two stores are connected and the logical control circuit.

In FIG. 1, 1 designates a coil connected to the output 46 of a bistable multivibrator 18. The coil 1 is also connected to a relay 3 with two positions A, B, connected to a potentiometer 2, the relay being connected to the input 4 of a differential amplifier 5. To one end of resistor 2 is connected an input terminal to which is connected a signal generating device, for example a mass spectrometer, 48. The output 6 of the differential amplifier is connected to a trigger circuit 7 with a threshold value, a control gate 8, a shaping element 9, a binary counter 10 and a digital to analog converter 11 which is connected to the input 12 of the differential amplifier 5. A fixed frequency generator 13 is located in front of the gate 8. Lines 14 and 15 connect the counter 10 to a multivibrator 16 in turn connected to a differential element 17 connected to the multivibrator 18.

The output 19 of the differential amplifier 5 is connected to an arrangement which comprises in succession a trigger circuit 20 with a threshold value, an integrator circuit 21, a reversing amplifier 22, a monostable time-delay multivibrator 23, a gate 24, a monostable time-delay multivibrator 25, another monostable time-delay multivibrator 26, a third monostable time-delay multivibrator 27, a shaping eleent 28 connected to the multivibrator 18 and a store 29 connected to the multivibrator 25 through a gate 30 and to the counter 10, through a gate 32, by the line 31, and also to the multivibrator 26 through a gate 32, and a second store 33 connected to the multivibrator 25 by the lines 34 and 35 and through a gate 40 to the counter 10 by the line 37, and also to the multivibrator 26 through the lines 38 and 39 and through the gate 40.

The line 39 also supplies current to a monostable time-delay multivibrator 41 which controls two gates 8 and 24 and a capacitor 42 connected to a reversing amplifier 43 connects the line 15 to the line 44. Finally the gates 30 and 32 are connected to the output 45 of the multivibrator 18 and the gates 36 and 40 to the output 46 of the same multivibrator 18.

The mode of operation of the device above described in an embodiment for two signals A and B is as follows.

The object of the application of the device is to study the relative variation in two signals supplied from a mass spectrometer. To this end, a mass spectrometer periodically and according to a predetermined scanning frequency, produces two unequal signals corresponding to two constituents of the sample being analysed, for example, as shown in FIG. 2. The signals are from peaks of intensity, that is, an intensity which varies very rapidly starting with zero, reaching a maximum and falling again to zero. The maximum of intensity is the significant figure and represents, in analog form, the instantaneous value of the peak. The signals are delivered from the mass spectrometer on a single line, the spectrometer providing a commutation which effects sampling of values of several constituents in a cyclic manner. The instant device permits the directing of the measured values toward one of a plurality of memories (one for each constituent being analyzed) corresponding to the particular constituent being measured at that time. The input device may actually be any device which delivers a cyclical signal on a single input line, i.e., a multi-channel voltmeter. These signals are first equalised by attenuating the greater by means of the potentiometer 2 and are then periodically conveyed to the differential amplifier 5 by means of the two-position (A, B) relay 3, the position of the relay being determined by the coil 1 according to the state of the bistable multivibrator 18.

We shall first consider the peak A, as shown in FIG. 3, which will be coded in the following conventional manner. As soon as the peak A appears, the potential at the input 4 of the differential amplifier 5 begins to increase. Once this potential exceeds *n* microvolts, the trigger circuit 7 operating with a threshold value opens the gate 8 which allows the fixed frequency generator 13 to convey pulses through the shaping element 9 and into the binary counter 10. These increments *n* are shown in FIG. 4 in relation to value of the peak. The counter 10 is connected to a digital to analog converter 11 which will supply a certain reference voltage to the input 12 of the amplifier 5. In this manner, the converter 11 regularly supplies a reference voltage which will continue to increase in equal steps of *n* microvolts and will be fe dback to the input of the amplifier 5. Thus, as long as the voltage difference between the inputs 4 and 12 is greater than these *n* microvolts, the gate 8 will remain open and the generator 13 will supply pulses which are counted by the counter 10. The increase in the signal is thus matched. The output 6 of the amplifier 5 controls the detection of peak A, the counting of the pulses as long as the discrepancy in the comparator indicates that the peak is increasing and the cessation of counting when the peak is at maximum value, whereas the output 19 of the amplifier 5 will control the transfer of coded data in the counter 10 to a store and the position of the relay which switches to B as soon as the amplitude of the signal decreases by *n* microvolts. In fact, once the peak A begins to decrease and as soon as a voltage decrease of more than *n* microvolts is registered between 12 and 4, the trigger circuit 20 supplies a signal which is integrated by the integrator 21 and is amplified and reversed by the amplifier 22 and applied to the time-delay multivibrator 23 which opens the gate 24. Once this gate is open, the command signal is applied by the time-delay multivibrator 25 to the store 29, through the gate 30 which is open because of the state of the multivibrator 18 and will control the return of the store to zero, and to the time-delay multivibrator 26 which will control, through the gate 32 which is also open because of the state of the multivibrator 18, the transfer of the contents of the counter 10 to the store 29 along the line 31; the command signal which leaves the multivibrator 26 passes through the multivibrator 27 and along the circuit 42–43 and the line 15 to return the counter to zero and also passes through a shaping element 28 and changes the state of the multivibrator 18 which will now act through its output 45 to close the gates 30 and 32 and through its output 46 to open the gates 36 and 40 in order to allow the contents of the counter relative to peak B to be conveyed to the second store 33.

The change of state of the multivibrator 18 also affects the energising of the coil 1 so as to position the relay 3 at B for the second peak B, as represented in FIG. 3. For this peak B, operation is the same, except that the coded data relative thereto is conveyed to the second store 33. The command signal from the trigger circuit 20 will subsequently affect the state of the multivibrator 18 and thus re-position the relay 3 and A. Moreover the signal controlling transfer of data to the store 33 will also affect the multivibrator 41 which will block the two gates 8 and 24 for the whole duration of the return of the mass spectrometer scanning cycle so as to avoid recording of the two peaks in the return cycle.

Moreover, any overflow in the counter 10 due to deflective functioning of the relay 1 or the potentiometer 2 is registered by the multivibrator 16 which acts through the differential element 17 to return the multivibrator 18 to the state which corresponds to the first peak A of the cycle.

Thus subsequent scanning processes carried out using the mass spectrometer will cause the peaks A and B to reappear in normal order so that they will be dealt with correctly, the logical circuit of the device being controlled by the peaks themselves. Thus the directing of the input values to the proper memory or totalizer is controlled by the internal logic of the device itself, with no outside reference save for the input signal peaks.

The number of signals which may be processed in this manner is not, of course, limited to two but may be any number, the number of signals determining the number of stores required and the number of multivibrators to be arranged in cascade.

Similarly, if the number of signals is greater than two, the command by which data is transferred from the counter to the last store is also applied to a monostable time-delay multivibrator which will block the scanning process effected by the mass spectrometer during the return cycle.

The present invention is of course by no means limited to the embodiment herein described and shown but extends to all modifications thereof.

We claim:

1. An analogue to digital converter for converting the maximum amplitude of peaks of intensity which appear successively at the output of a cyclical apparatus of multi-channel sampling, comprising:

(a) input means connected to the output of said cyclical multi-channel sampling apparatus,
(b) a differential amplifier having two inputs and an output,
(c) said input means connected to a first of said differential amplifier inputs,
(d) a first threshold trigger controlling a first gate,
(e) a first of said differential amplifier outputs connected to said threshold trigger,
(f) a constant frequency oscillator,
(g) a counter having an input and an output,
(h) said oscillator applying pulses to said counter, said pulses being passed through said first gate,
(i) a digital to analog converter having an input and an output,
(j) said output of said counter connected to said input of said digital to analog converter,
(k) said output of said digital to analog converter connected to a second of said differential amplifier inputs,
(l) a plurality of stores, one for each sampled channel of input information,
(m) a second threshold trigger having an input and an output,
(n) a second of said differential amplifier outputs connected to said second threshold trigger input, said second differential amplifier output emitting a pulse when an intensity peak at said input terminal decreases,
(o) said second threshold trigger output controlling means for connecting one of said plurality of stores to receive information from one of said sampled channels, means for transferring into said one of said plurality of stores the pulse information contained in said counter, and means for returning said counter to zero.

2. An apparatus as set forth in claim 1, wherein said cyclical apparatus is a mass spectrometer and further comprising means for blocking said apparatus during the return cycle of said mass spectrometer, said means being connected to the two outputs of said differential amplifier.

3. Apparatus as set forth in claim 1 further comprising:
(a) an integrator,
(b) said second threshold trigger output being connected to an input of said integrator,
(c) said integrator connected to an inverting amplifier,
(d) said inverting amplifier connected to a first monostable multivibrator,
(e) said first monostable multivibrator connected, through a second gate, to a series of three monostable multivibrators,
(f) a plurality of pairs of gates, one pair of gates associated with each of said plurality of stores,
(g) a bistable multivibrator for controlling the opening of each of said pairs of gates,
(h) said first monostable multivibrator of said series connected in parallel to a first of each of said pairs of gates, for connecting one of said stores to receive information from its respective channel,
(i) said second monostable multivibrator of said series connected in parallel to a second of each of said pairs of gates, to control the transfer of information contained in said counter to its proper store,
(j) said counter being connected in parallel to each of said plurality of stores across said second of each of said pairs of gates,
(k) said third monostable multivibrator of said series having an output which controls means for resetting said counter to zero across a circuit comprising a capacitor in series with a second inverting amplifier.

4. Apparatus as set forth in claim 2 wherein said means for blocking comprises said first gate and a further gate, one of said gates at each of said two outputs of said differential amplifier, said pair of gates being closed during a time equal to said return cycle, by an impulse emitted by a further monostable multivibrator.

References Cited

UNITED STATES PATENTS

| | | | |
|---|---|---|---|
| 3,091,664 | 5/1963 | Tyrlick | 179—15 |
| 3,134,957 | 5/1964 | Foote et al. | 340—347 |
| 3,422,422 | 1/1969 | Frank et al. | 340—347 |
| 3,426,296 | 2/1969 | Christiansen et al. | 325—38 |
| 2,656,524 | 10/1953 | Gridley et al. | 340—347 X |
| 2,828,482 | 3/1958 | Schumann | 340—347 |
| 2,960,690 | 11/1960 | Curtis | 340—347 |
| 2,966,672 | 12/1960 | Horn | 340—347 |
| 3,017,093 | 1/1962 | Rowley | 235—92 |

G. EDWARDS, Primary Examiner

U.S. Cl. X.R.

179—15